(12) United States Patent
Holubarsch et al.

(10) Patent No.: US 11,652,257 B2
(45) Date of Patent: May 16, 2023

(54) DROP PROTECTION SYSTEM FOR RECHARGEABLE BATTERIES

(71) Applicant: Hilti Aktiengesellschaft, Schaan (LU)

(72) Inventors: Markus Holubarsch, Landsberg am Lech (DE); Stefan Schmid, Untermuehlhausen (DE); Tobias Koeniger, Bregenz (AT); Michael Göttlinger, Landshut (DE); Katharina Marsiglia, Munich (DE); Julian Harbaum, Peissenberg (DE); Bernd Ziegler, Schwabmuenchen (DE); Dieter Profunser, Kaufering (DE); Ralf Meixner, Germaringen (DE); David Klingen, Munich (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 17/711,135

(22) Filed: Apr. 1, 2022

(65) Prior Publication Data

US 2022/0223964 A1 Jul. 14, 2022

Related U.S. Application Data

(63) Continuation of application No. 17/343,413, filed on Jun. 9, 2021, now Pat. No. 11,329,345, which is a (Continued)

(30) Foreign Application Priority Data

Mar. 25, 2019 (EP) ..................... 19164821

(51) Int. Cl.
*H01M 50/242* (2021.01)
*H01M 50/207* (2021.01)
(Continued)

(52) U.S. Cl.
CPC ..... *H01M 50/242* (2021.01); *H01M 10/0422* (2013.01); *H01M 50/207* (2021.01); *H01M 50/213* (2021.01)

(58) Field of Classification Search
CPC ............ H01M 50/242; H01M 50/213; H01M 50/207; H01M 10/0422
See application file for complete search history.

(56) References Cited

U.S. PATENT DOCUMENTS 10,486,297 B2 11/2019 Runau
2005/0058890 A1 3/2005 Brazel et al.
(Continued)

FOREIGN PATENT DOCUMENTS

CN 104919623 A 9/2015
CN 107210399 A 9/2017
(Continued)

OTHER PUBLICATIONS

International Search Report of PCT/EP2020/057056, dated May 13, 2020.

*Primary Examiner* — Jane J Rhee
(74) *Attorney, Agent, or Firm* — Davidson, Davidson & Kappel, LLC

(57) ABSTRACT

A shock absorbing device for a rechargeable battery, in particular for supplying a machine tool with electrical energy, wherein the rechargeable battery includes a housing for accommodating at least one energy storage cell. The shock absorbing device includes at least one shock absorbing element for absorbing shock energy exerted on the housing of the rechargeable battery.

20 Claims, 17 Drawing Sheets

Related U.S. Application Data continuation of application No. PCT/EP2020/057056, filed on Mar. 16, 2020.

(51) Int. Cl.
  *H01M 10/04* (2006.01)
  *H01M 50/213* (2021.01)

(56) References Cited

U.S. PATENT DOCUMENTS

| | | |
|---|---|---|
| 2015/0019471 A1 | 7/2015 | Naito et al. |
| 2015/0325826 A1 | 11/2015 | Verhaag et al. |
| 2016/0006005 A1 | 1/2016 | Sakakibara |
| 2016/0229308 A1 | 8/2016 | Nusier et al. |
| 2016/0372939 A1 | 12/2016 | Roehm et al. |
| 2018/0193995 A1 | 7/2018 | Runau |

FOREIGN PATENT DOCUMENTS

| | | |
|---|---|---|
| CN | 107845748 A | 3/2018 |
| EP | 3085499 A1 | 10/2016 |
| EP | 3428993 A1 | 1/2019 |
| JP | 2016018604 A | 2/2016 |

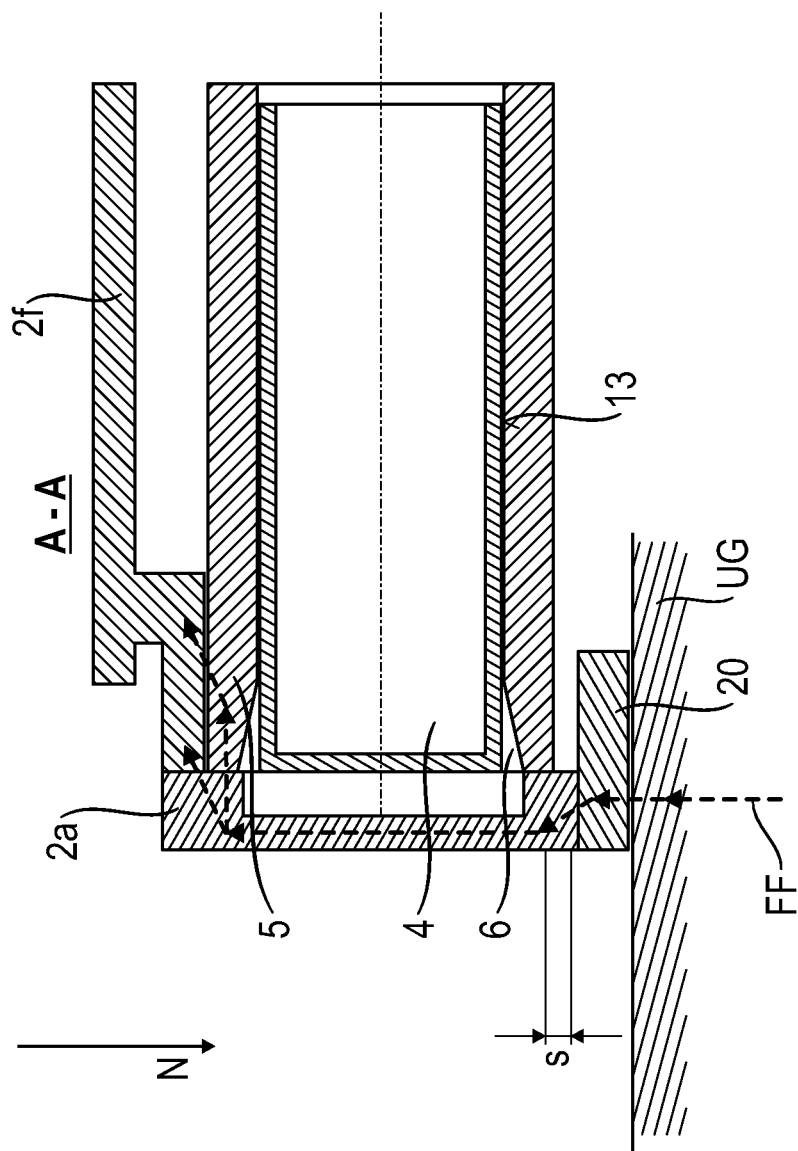

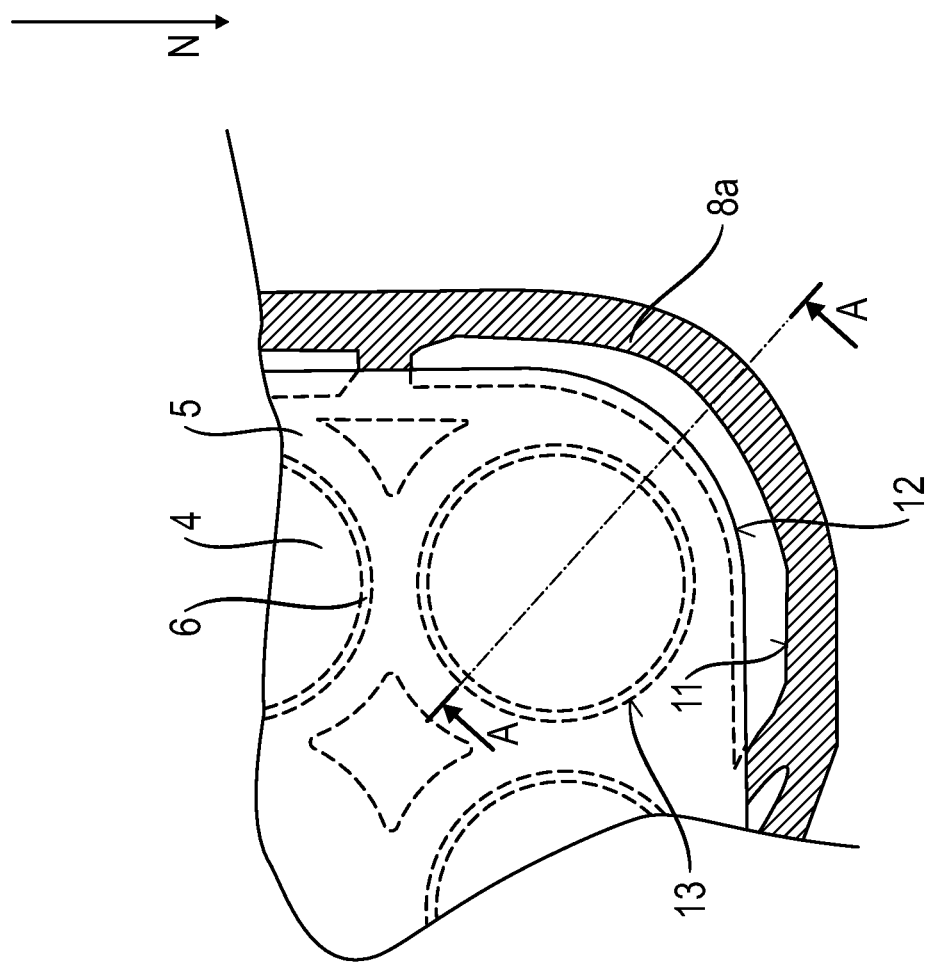

DROP PROTECTION SYSTEM FOR RECHARGEABLE BATTERIES

This is a continuation of U.S. patent application Ser. No. 17/343,413, filed on Jun. 6, 2021, now published as U.S. Patent Publication 2021/0384579 A1, which is a continuation of International Patent Application PCT/EP2020/057056, filed on Mar. 16, 2020 which claims priority to European Patent Application EP 19164821.1, filed Mar. 25, 2019. All of the above applications are hereby incorporated by reference herein.

The present invention relates to a shock absorbing device for a rechargeable battery, in particular for supplying a machine tool with electrical energy, wherein the rechargeable battery comprises a housing for accommodating at least one energy storage cell.

BACKGROUND

Rechargeable batteries available on the market usually contain a multiplicity of energy storage cells, also called rechargeable battery cells, which are used for storing and releasing electrical energy. The housing of the rechargeable battery usually consists of a relatively hard plastic shell. For example, the hard plastic may be polyamide.

Conventional energy storage cells or rechargeable battery cells are relatively sensitive and should be protected from a suddenly occurring effect of a force, from shocks and the like. Such an effect of a force on the energy storage cells can occur as a consequence of a fall or drop of the rechargeable battery when the housing of the rechargeable battery strikes a hard inelastic surface (e.g. a concrete floor) from a certain falling height. During this process, the shock energy can be transmitted via the rechargeable battery housing to the energy storage cells and can produce damage to the energy storage cells.

SUMMARY OF THE INVENTION

It is an object of the present invention to solve the abovementioned problem and, in particular, to better protect energy storage cells in the interior of a rechargeable battery housing in the case of a fall.

The present invention provides a shock absorbing device for a rechargeable battery, in particular for supplying a machine tool with electrical energy, wherein the rechargeable battery comprises a housing for accommodating at least one energy storage cell.

The shock absorbing device comprises at least one shock absorbing element for absorbing shock energy exerted on the housing of the rechargeable battery.

According to an advantageous embodiment of the present invention, it is possible for the at least one shock absorbing element to extend from a first side face of the housing of the rechargeable battery to a second side face of the housing of the rechargeable battery. It is thereby possible in an effective manner to protect a lateral edge between a first and a second side face of the housing of the rechargeable battery via the shock absorbing element. In the case of a fall or a drop of the rechargeable battery onto a hard surface, the sudden action of shock energy, particularly at the lateral edges between the side faces, can lead to damage to the housing of the rechargeable battery and to the energy storage cells.

It should be noted here that two mutually adjoining side faces are in each case arranged substantially at a right angle (i.e. 90°) to one another. However, it is also possible for two mutually adjoining side faces not to be arranged at a right angle to one another (i.e. greater or less than 90°) in each case.

In this case, the housing of the rechargeable battery can comprise six side faces.

According to an advantageous embodiment of the present invention, it may be possible for the at least one shock absorbing element to be configured in the form of a yoke.

The choice of material and the particular shaping of the shock absorbing element enable said element to be plastically or elastically deformable.

According to an advantageous embodiment of the present invention, it is possible for the shock absorbing element configured as a yoke to comprise a first end and a second end, wherein the first end is positioned on a first side face of the housing, and the second end is positioned on a second side face of the housing. It is thereby possible to produce a cavity or recess between the side faces and the shock absorbing element which, in the case of shock energy acting suddenly on the rechargeable battery housing, can be used as a crumple zone or as a region into which the shock absorbing element can be deformed. By means of the deformation of the shock absorbing element, energy, in particular shock energy, can be absorbed. Here, the deformation of the shock absorbing element can take place elastically or plastically.

According to an advantageous embodiment of the present invention, it may be possible for a substantially constant distance to be provided between the surface of the shock absorbing element and an outer surface of the housing of the rechargeable battery.

According to another advantageous embodiment of the present invention, however, it is also possible for the distance between the surface of the shock absorbing element and an outer surface of the housing of the rechargeable battery to be non-constant or variable.

According to an advantageous embodiment of the present invention, it is possible for the shock absorbing element configured as a yoke to be positioned on the housing in such a way that an arcuate section of the shock absorbing element configured as a yoke extends around a lateral edge of two mutually adjoining side faces of the housing.

According to an advantageous embodiment of the present invention, it may be possible for the shock absorbing element configured as a yoke to comprise at least two component pieces, in particular five component pieces, wherein two mutually adjoining component pieces are in each case arranged at an obtuse angle to one another. The obtuse angle can have a value between 110° and 150°. The component piece can also be referred to as a yoke section.

According to an advantageous embodiment of the present invention, it is possible for the shock absorbing element configured as a yoke to be configured in the form of a circular arc.

According to an advantageous embodiment of the present invention, it may be possible for the shock absorbing element of the shock absorbing device to be fixed to the housing of the rechargeable battery or to be an integral part of the housing of the rechargeable battery. Via the fixed (i.e. permanent) connection of the shock absorbing device to the housing of the rechargeable battery, a high strength or robustness of the shock absorbing device can be produced. The fixed connection can be by way of common encapsulation or a casting process for the production of the rechargeable battery housing and of the shock absorbing device. This is possible, in particular, if the rechargeable battery housing and the shock absorbing device are produced from the same material (e.g. polycarbonate or polyamide).

As an alternative and according to another advantageous embodiment of the present invention, it may be possible for the at least one shock absorbing element of the shock absorbing device not to be fixed to the housing of the rechargeable battery but to be detachable therefrom. A connection which is not fixed and is detachable can be achieved via a screwed joint, for example.

The present invention also provides a device for supplying a machine tool with electrical energy, the device comprising: a rechargeable battery including a housing for accommodating at least one energy storage cell, the housing having a first side face and a second side face angled with respect to the first side face and connected at a corner; and a shock absorbing device including at least one shock absorber, the shock absorber extending around the corner and spaced apart from the housing at the corner by an empty space.

The present invention also provides a device for supplying a machine tool with electrical energy, the device comprising: a rechargeable battery including a housing for accommodating at least one energy storage cell, the housing having a first side face and a second side face angled with respect to the first side face and connected via a curved surface; and a shock absorbing device including at least one shock absorber, the shock absorber having a first inner surface spaced apart and parallel to the first side face, a second inner surface spaced apart and facing the curved surface, and a third inner surface is parallel to the second side face, the shock absorbing device being configured so that the second inner surface is movable with respect to the curved surface to enable contact between the second inner surface and the curved surface.

The present invention also provides a device for supplying a machine tool with electrical energy, the device comprising:
a rechargeable battery including a housing for accommodating at least one energy storage cell, the housing having a first side face and a second side face angled with respect to the first side face and connected at a corner; and
a shock absorbing device including at least one shock absorber, the shock absorber extending around the corner and spaced apart from the housing at the corner, the shock absorber having a thickness t at the corner and being spaced apart from the corner by a distance b, wherein t meets the following: $0.5 \times b \leq t \leq 2 \times b$.

Further advantages will become apparent from the following description of the figures. Various exemplary embodiments of the present invention are illustrated in the figures. The figures, the description and the claims contain numerous features in combination. A person skilled in the art will expediently also consider the features individually and combine them to produce useful further combinations.

BRIEF DESCRIPTION OF THE DRAWINGS

In the figures, identical and similar components are denoted by identical reference signs.

In the figures:

FIG. 7*b* shows a sectional view of section plane A-A in FIG. 7*a*;

FIG. 9*a* shows a lateral sectional view through a corner region of the housings of the rechargeable battery and of the shock absorbing element according to a second embodiment in a no-load state;

DETAILED DESCRIPTION

Figure 1:
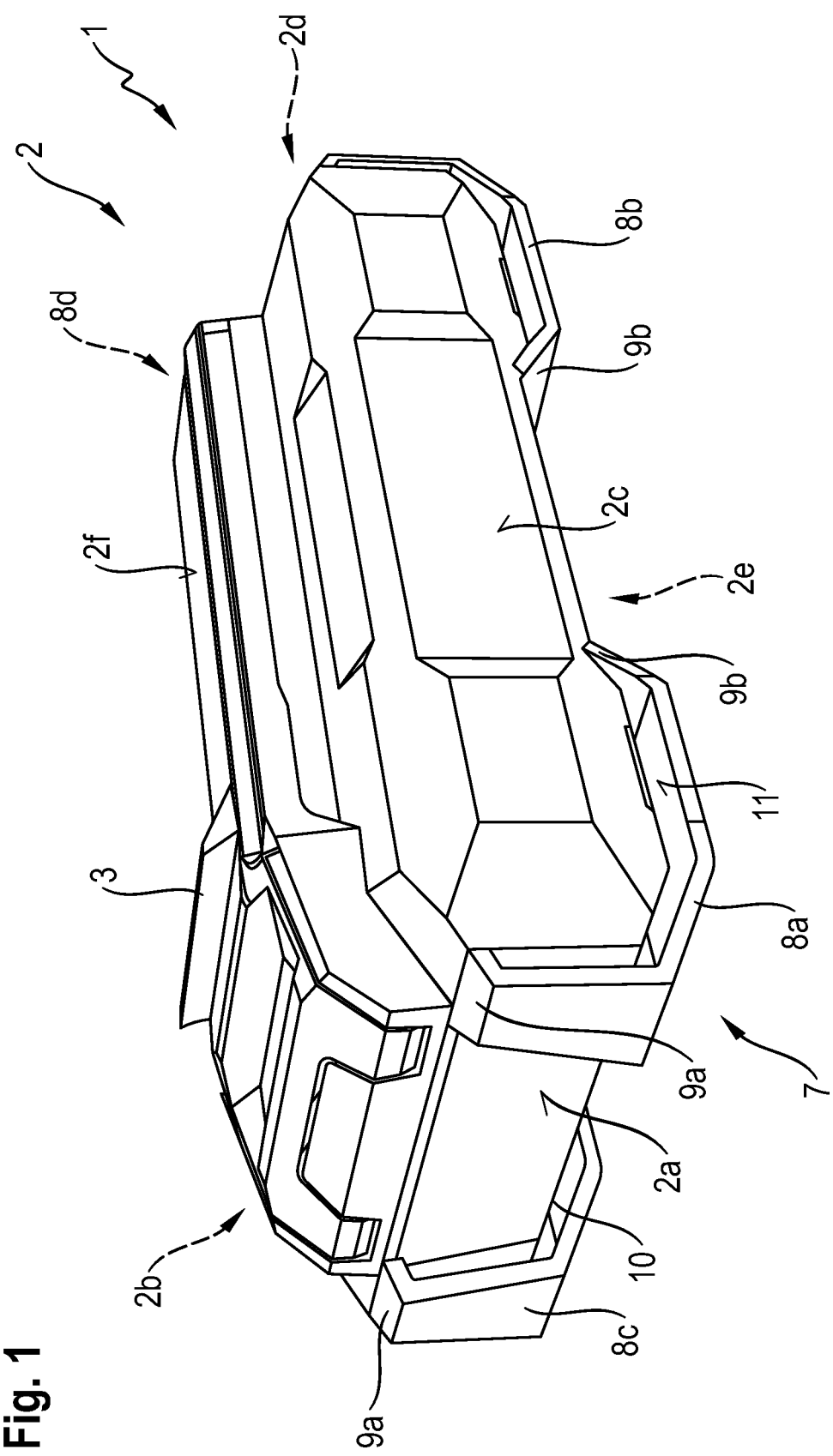
FIG. 1 shows a perspective view of a rechargeable battery having a housing, of a shock absorbing device according to the invention and shock absorbing elements.
Figure 2:
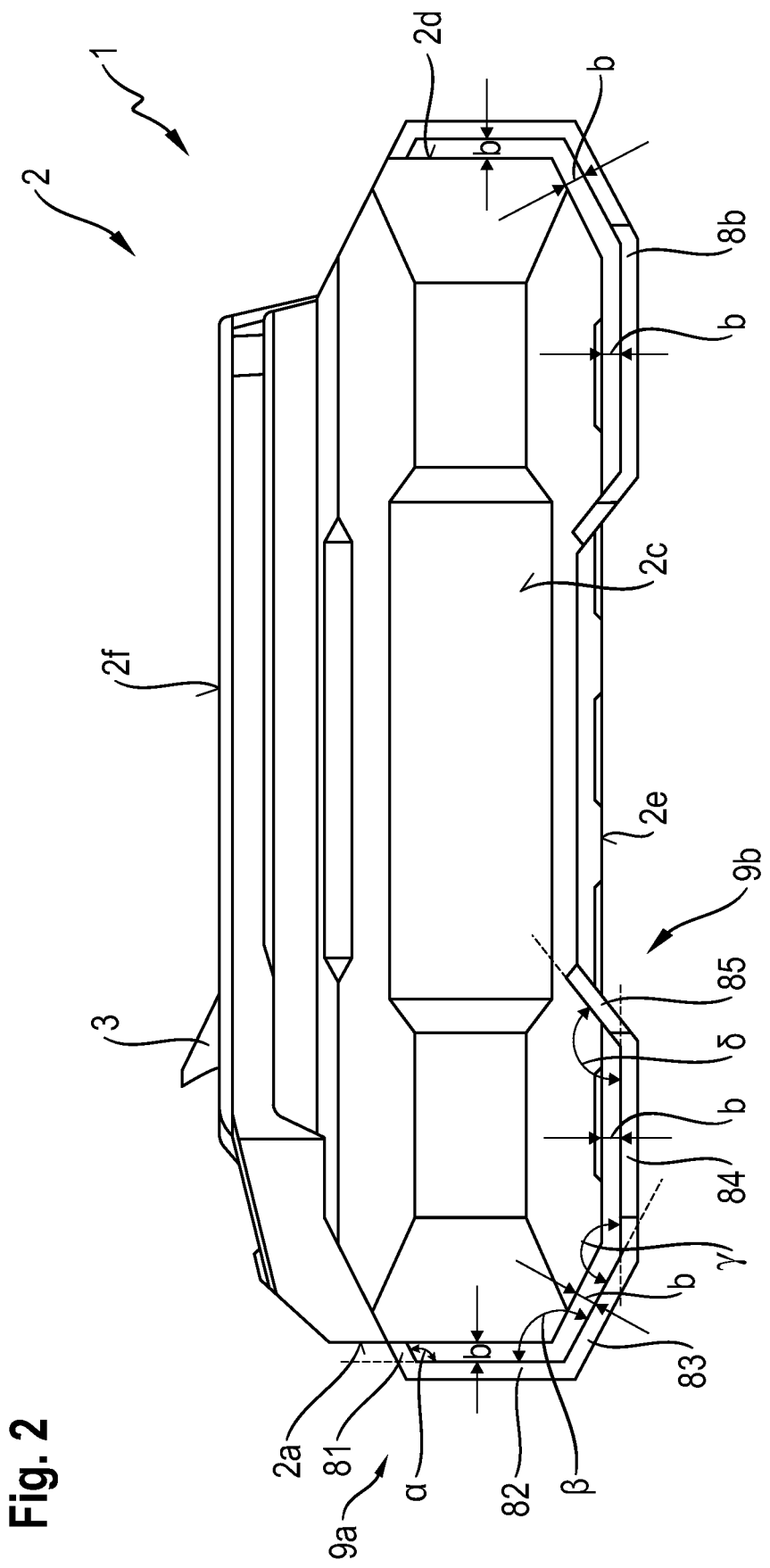
FIG. 2 shows a side view of the rechargeable battery having the housing, of the shock absorbing device according to the invention and of the shock absorbing elements.

FIGS. 1 and 2 show a rechargeable battery 1 having a housing 2. The housing 2 of the rechargeable battery 1 can also be referred to as a rechargeable battery housing and comprises six side faces or six sides, namely a front side face 2*a*, a left-hand wall side face 2*b*, a right-hand wall side face 2*c* and a rear side face 2*d*, a bottom side face 2*e* and a top side face 2*f*.

In FIG. 1, the left-hand wall side face 2*b*, rear side face 2*d* and bottom side face 2*e* are merely indicated.

An interface 3 for outputting electrical energy (electric current) to a consuming unit (e.g. a machine tool) or for receiving electrical energy via a charging device is provided on a top side face 2*f*. With the aid of the interface 3, the rechargeable battery 1 can be connected detachably to a machine tool or a charging device.

The rechargeable battery 1 illustrated in FIG. 1 is used, in particular, to supply a machine tool with electrical energy.

Figure 3:
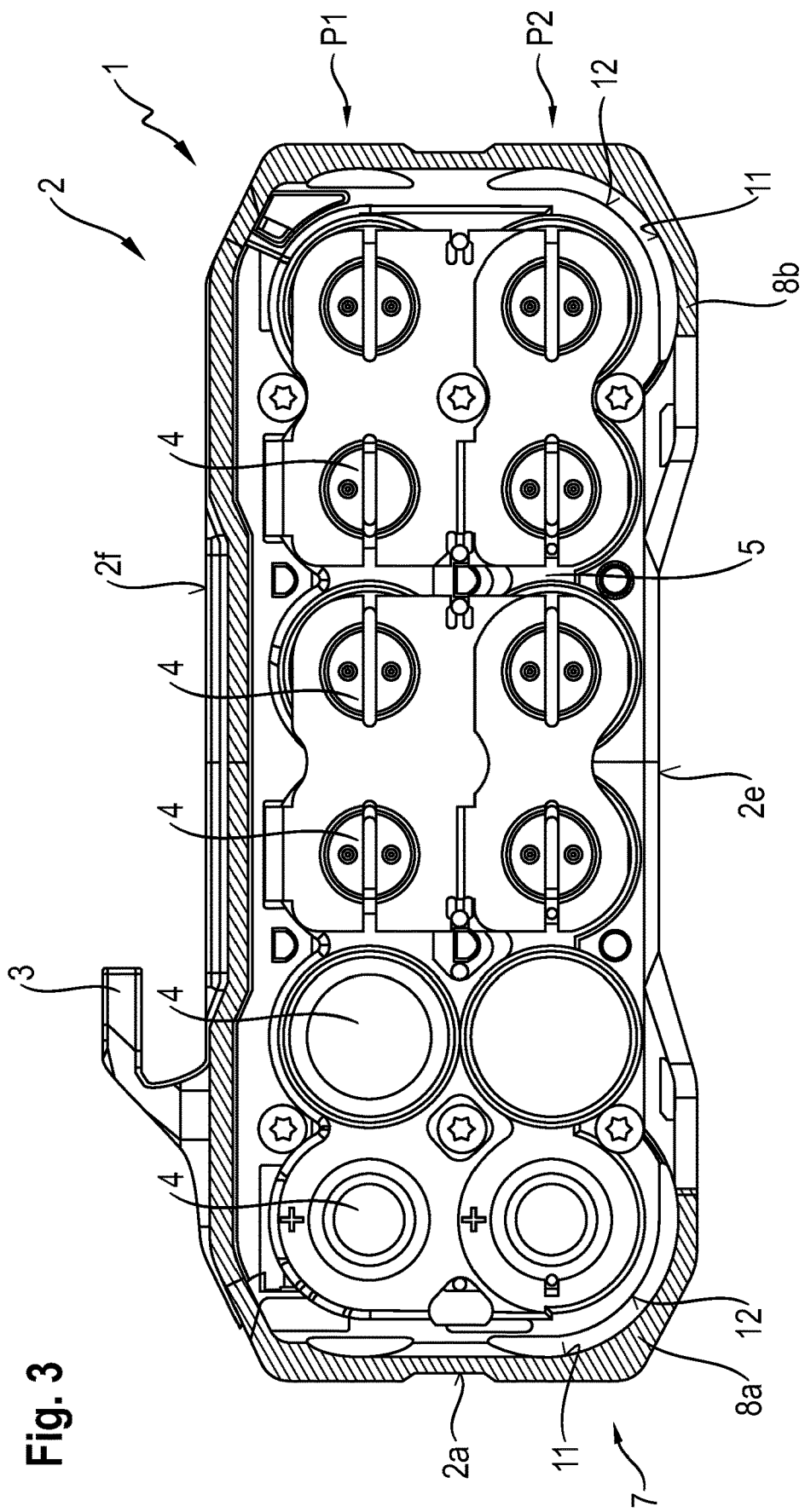
FIG. 3 shows a lateral sectional view through the housing of the rechargeable battery having a first and a second row of energy storage cells.
Figure 4:
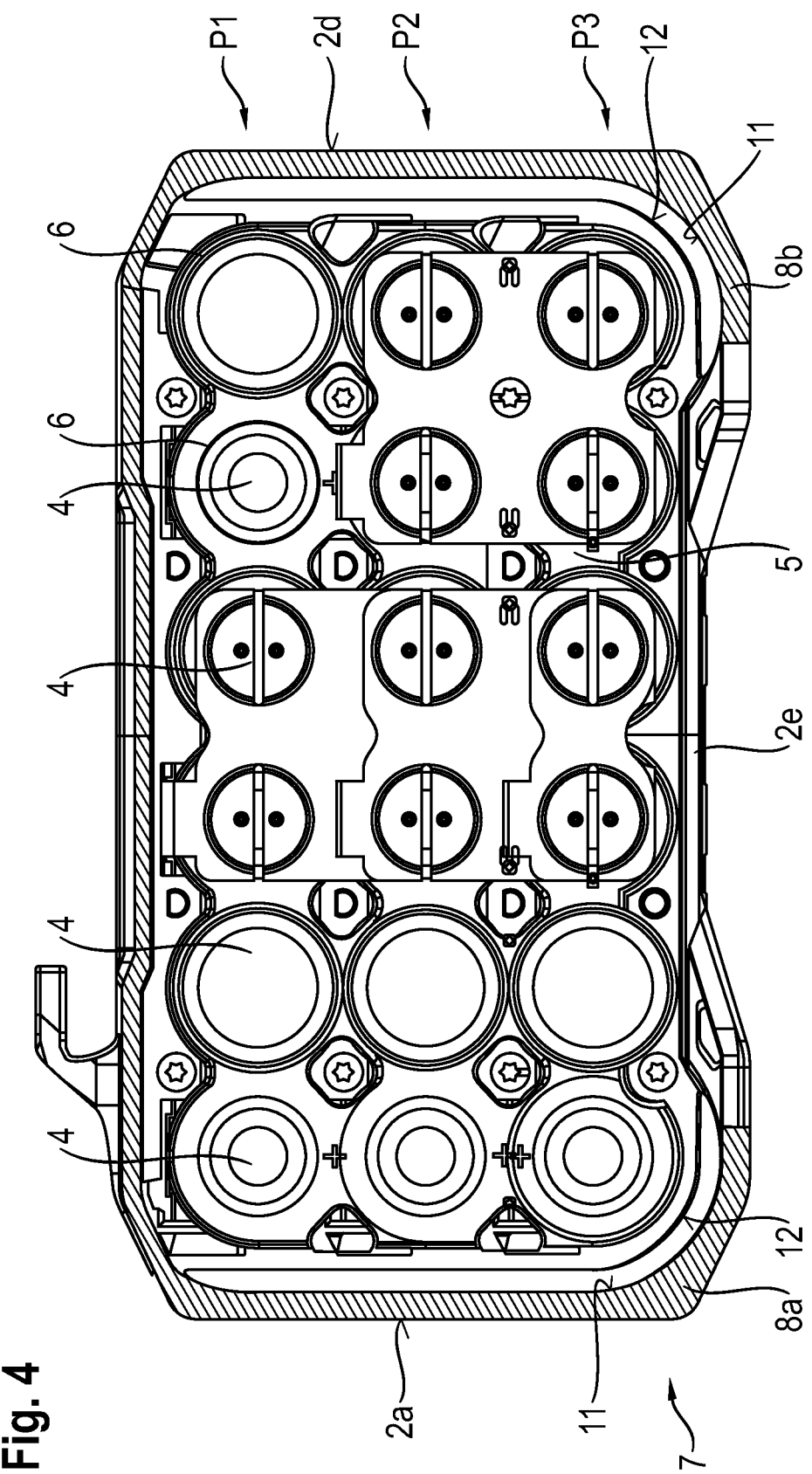
FIG. 4 shows a lateral sectional view through the housing of the rechargeable battery having a first, a second and a third row of energy storage cells.

As illustrated in FIGS. 3 and 4, a multiplicity of energy storage cells 4 is contained in the interior of the housing 2 of the rechargeable battery 1. The energy storage cells 4 can also be referred to as rechargeable battery cells and are used to store electrical energy. As is apparent, the rechargeable battery cells 4 can be arranged side-by-side and one above the other in two or three layers. The number of rechargeable battery cells 4 side-by-side and one above the other is variable. However, it is also possible for just a single energy storage cell 4 to be provided in the interior of the housing 2 of the rechargeable battery 1.

As is likewise illustrated in FIGS. 3 and 4, the energy storage cells 4 are of cylindrical configuration and are positioned in a cell holding device 5 (also referred to as a cell holder). The "cell holder" 5 is positioned in the interior of the rechargeable battery housing 2. For this purpose, the cell holding device 5 is configured substantially as a block with a number of bores 6. The individual rechargeable battery cells 4 are inserted into these bores 6, thus ensuring that the rechargeable battery cells 4 are held by the cell holding device 5. The bores 6 can also be referred to as recesses or holes.

According to an alternative embodiment, it is also possible for the energy storage cells 4 to be configured in the form of "pouch cells" (also referred to as pouch-bag cells or coffee bag cells).

There is furthermore a shock absorbing device 7 on the housing 2 of the rechargeable battery 1. According to the exemplary embodiment which is shown in FIGS. 1 and 2, the shock absorbing device 7 comprises a first, second, third and fourth shock absorbing element 8a, 8b, 8c, 8d. The fourth shock absorbing element 8d is merely indicated in the figures. The configuration of the shock absorbing element 8a, 8b, 8c, 8d is substantially identical and adapted to the respective position thereof on the housing 2 of the rechargeable battery 1.

The first shock absorbing element 8a is positioned at a first corner of the rechargeable battery housing 2 and is configured as a yoke with a first and a second end 9a, 9b. As illustrated in FIG. 2, the shock absorbing element 8a, 8b, 8c, 8d configured as a yoke comprises a first component piece 81, a second component piece 82, a third component piece 83, a fourth component piece 84 and a fifth component piece 85. The first component piece 81 is connected to the second component piece 82 at an obtuse angle α. The second component piece 82 is furthermore connected to the third component piece 83 at an obtuse angle β. The third component piece 83 is, in turn, connected to the fourth component piece 84 at an obtuse angle γ. Finally, the fourth component piece 84 is connected to the fifth component piece 85 at an obtuse angle δ. The obtuse angle α, β, γ, δ can have a value between 110° and 150°. However, a larger or smaller angle α, β, γ, δ is also possible, depending on the design. The angles α, β, γ, δ do not have to have the same value, and therefore the angles α, β, γ, δ may have different values. It is also possible for more or fewer than five component pieces to be used.

In this arrangement, the first end 9a of the shock absorbing element 8a, 8b, 8c, 8d configured as a yoke is arranged on the front side face 2a, and the second end 9b of the shock absorbing element 8a, 8b, 8c, 8d configured as a yoke is arranged on the bottom side face 2e. The shock absorbing element 8a, 8b, 8c, 8d configured as a yoke thus extends over the lateral edge 10 between the front side face 2a and the bottom side face 2e of the rechargeable battery housing 2 (cf. FIGS. 1 and 2).

Figure 5:
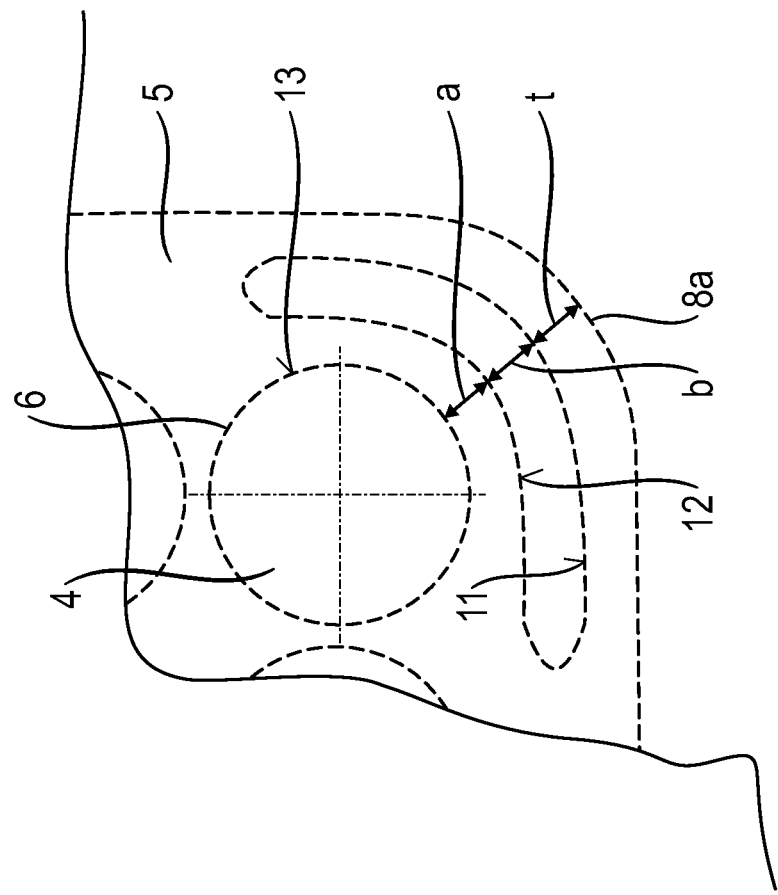
FIG. 5 shows a lateral sectional view through a corner region of the housings of the rechargeable battery and of the shock absorbing element.

As illustrated in the figures and especially in FIG. 5, the shock absorbing element 8a, 8b, 8c, 8d configured as a yoke is positioned on the rechargeable battery housing 2 in such a way that a constant distance b (can also be referred to as travel distance b) is provided between the inner surface 11 of the shock absorbing element 8a, 8b, 8c, 8d and the outer surface 12 of the rechargeable battery housing 2. As shown especially in FIGS. 5 to 11b, the shock absorbing element 8a, 8b, 8c, 8d configured as a yoke has a wall thickness t (also referred to as thickness).

Moreover, the shock absorbing element 8a, 8b, 8c, 8d configured as a yoke is positioned on the rechargeable battery housing 2 in such a way that a distance a from a surface 13 of a rechargeable battery cell 4 to the outer surface 12 of the rechargeable battery housing 2 is provided (cf. FIG. 5).

The shock absorbing element 8a, 8b, 8c, 8d as well as the rechargeable battery housing 2 are configured in such a way that the distance a, the distance b and the wall thickness t have a certain value and are formed in a certain relation to one another. Depending on the type of rechargeable battery 1 used (rechargeable battery type), i.e. on the number of rows or layers of rechargeable battery cells 4 (1p=one layer of rechargeable battery cells; 2p=two layers of rechargeable battery cells and 3p=3 layers of rechargeable battery cells), the distance a, the distance b and the wall thickness t have the numerical values in table 01.

TABLE 01

| Rechargeable battery type | a (mm) | b (mm) | t (mm) |
| --- | --- | --- | --- |
| 1p | 3.5 | 2 | 2.5 |
| 2p | 3.5 | 2 | 2.5 |
| 1p | 4.5 | 3 | 2.5 |
| 2p | 4.5 | 3 | 3 |
| 3p | 4.5 | 3 | 3.5 |

The ratio of the numerical values for the distance b and the wall thickness t can furthermore be set in relation by means of the formula 01.

$$0.5 \times b \leq t \leq 2 \times b \qquad \text{Formula 01}$$

As already mentioned above, the shock absorbing device 7 and, in particular, the shock absorbing element 8a, 8b, 8c, 8d serve to convert shock energy acting suddenly on the rechargeable battery housing 2 in the case of a fall or drop of the rechargeable battery into deformation energy by virtue of its specific physical properties and thereby to protect the rechargeable battery cells 4 arranged in the rechargeable battery housing 2 from possible damage.

The actual deformation of the shock absorbing element 8a, 8b, 8c, 8d is illustrated for the respective embodiment of the shock absorbing device 7 in FIGS. 6a to 11b.

Figure 6A:
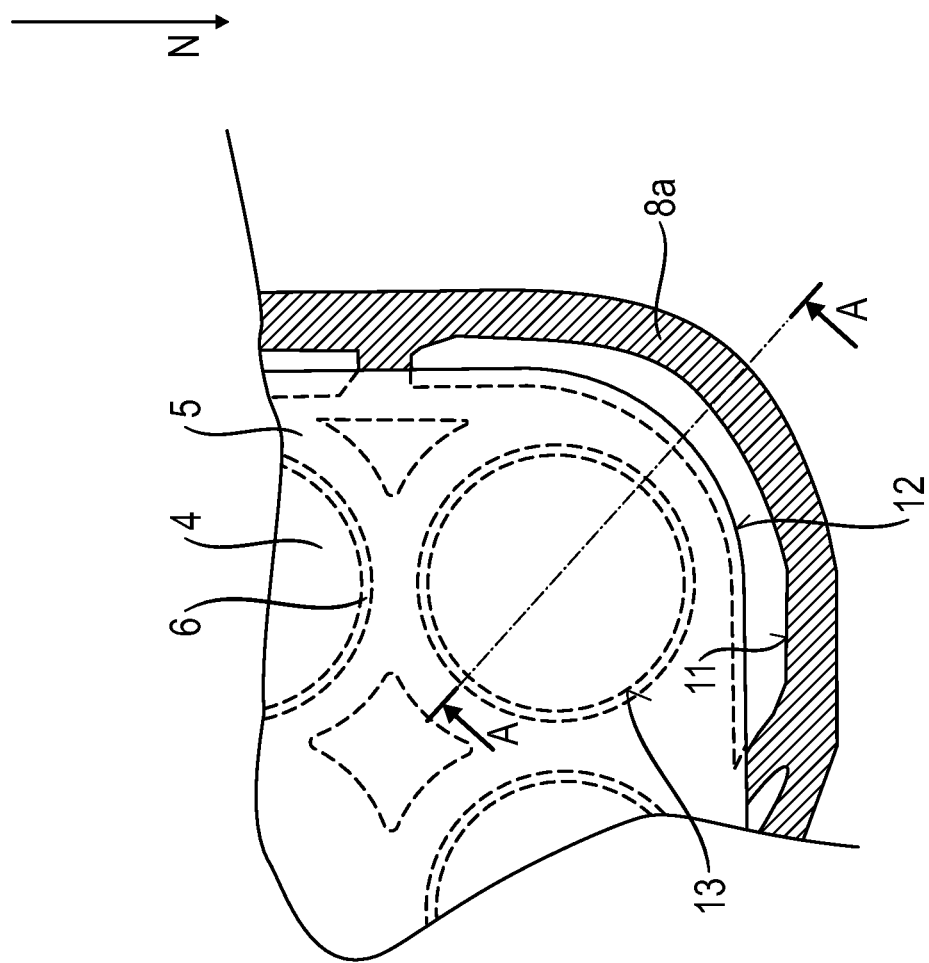
FIG. 6*a* shows a lateral sectional view through a corner region of the housings of the rechargeable battery and of the shock absorbing element according to a first embodiment in a no-load state.
Figure 6B:
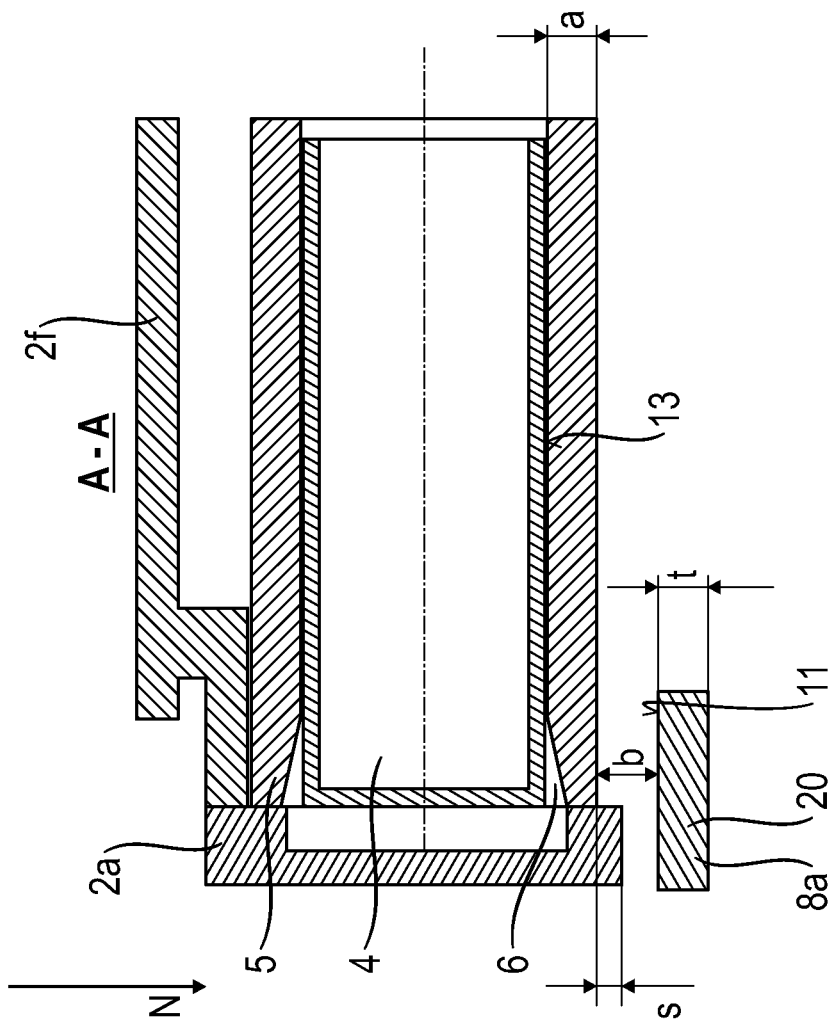
FIG. 6*b* shows a sectional view of section plane A-A in FIG. 6*a*.

FIGS. 6a and 6b show a shock absorbing device 7 according to a first embodiment, in which the shock absorbing element 8a has a symmetrical rectangular cross-sectional area 20. Here, FIG. 6a shows a lateral sectional view through a corner region of the rechargeable battery housing 2 and of the shock absorbing element 8a according to the first embodiment in a no-load state. The shock absorbing element 8a is at a distance b from the rechargeable battery housing 2. FIG. 6b shows a sectional view of section plane A-A in FIG. 6a, likewise in a no-load state. A no-load state means that there is no external force acting on the shock absorbing element 8a. As is also apparent in FIG. 6b, the rechargeable battery housing 2 projects with an overlap s beyond the bottom edge of the cell holder 5 in arrow direction N.

Figure 7A:
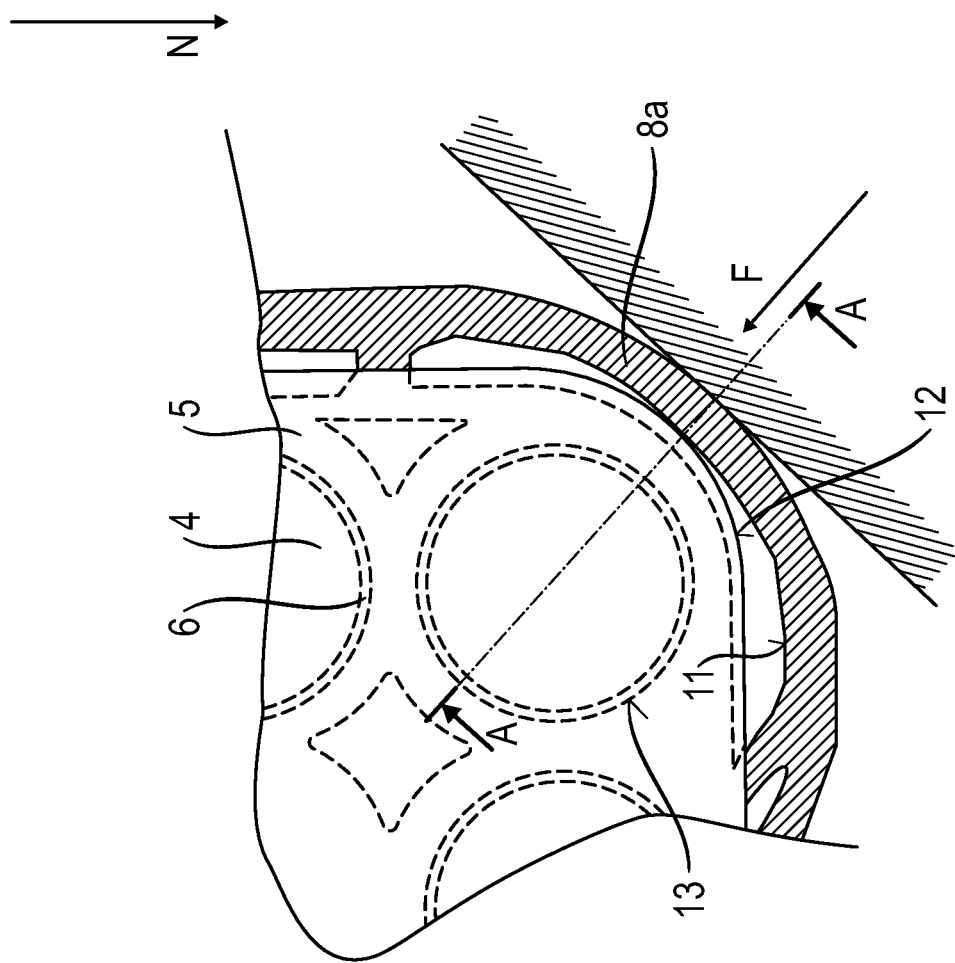
FIG. 7*a* shows a lateral sectional view through a corner region of the housings of the rechargeable battery and of the shock absorbing element according to a first embodiment in a partially loaded state.

In FIG. 7a, the shock absorbing device 7 according to the first embodiment is shown when a first force F is exerted on the shock absorbing element 8*a*. The first force F results from a fall of the rechargeable battery 1 and the impact of the rechargeable battery housing 2 on a hard inelastic underlying surface (e.g. concrete). In FIG. 7*a*, it is apparent in comparison with FIG. 6*a* that the shock absorbing element 8*a* is being deformed and moved toward the outer surface 12 of the rechargeable battery housing 2. As illustrated in FIG. 7*b*, the inner surface 11 of the shock absorbing element 8*a* is resting against the outer surface 12 of the rechargeable battery housing 2, with the result that the shock energy or the force flow FF is diverted from the shock absorbing element 8*a*, via the front side face 2*a*, into the top side face 2*f* of the rechargeable battery housing 2 and partially into the cell holder 5 and is guided around the rechargeable battery cells 4. As is likewise apparent from FIG. 7*b*, the front side face 2*a* of the rechargeable battery housing 2 is not compressed, and therefore the overlap s of the rechargeable battery housing 2 still exists.

Figure 8A:
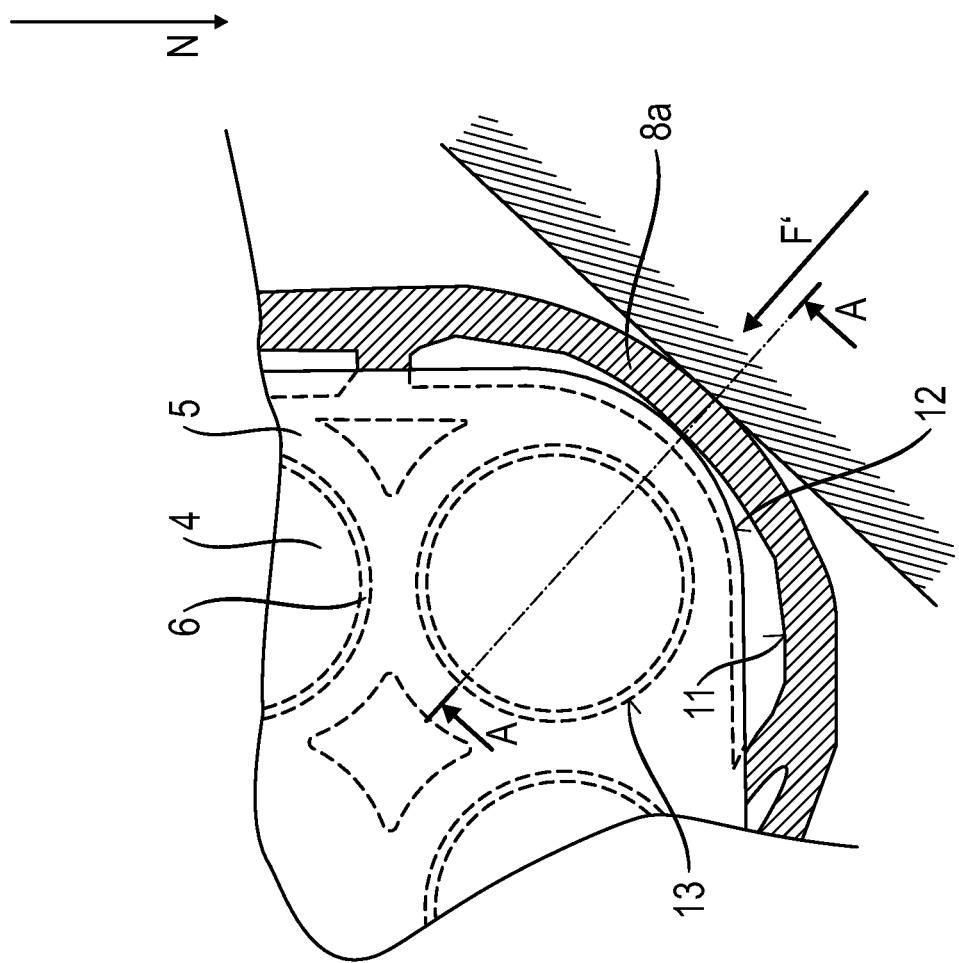
FIG. 8*a* shows a lateral sectional view through a corner region of the housings of the rechargeable battery and of the shock absorbing element according to a first embodiment in a fully loaded state.
Figure 8B:
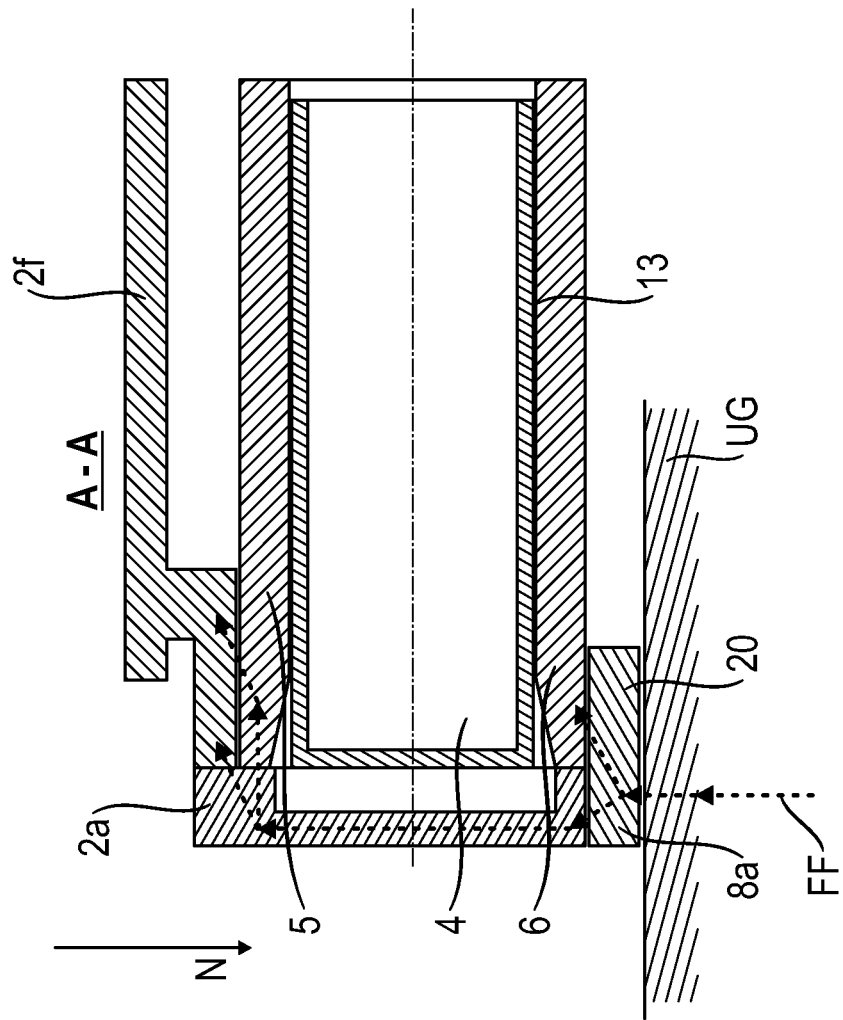
FIG. 8*b* shows a sectional view of section plane A-A in FIG. 8*a*.

In FIGS. 8*a* and 8*b*, the shock absorbing device according to the first embodiment is shown when a second force F', which is greater than the first force F, is being exerted on the shock absorbing element 8*a*. The second force F' exerted on the shock absorbing element 8*a* has the effect that the shock absorbing element 8*a* is pressed more strongly against the front side face 2*a* of the rechargeable battery housing 2. Owing to the higher second force F', the front side face 2*a* of the rechargeable battery housing 2 is compressed, with the result that the overlap s of the rechargeable battery housing 2 is pressed in. By the pressing in of the overlap s, additional shock energy or impact energy is absorbed by the rechargeable battery housing 2, and the rechargeable battery cells 4 are additionally protected.

Figure 9B:
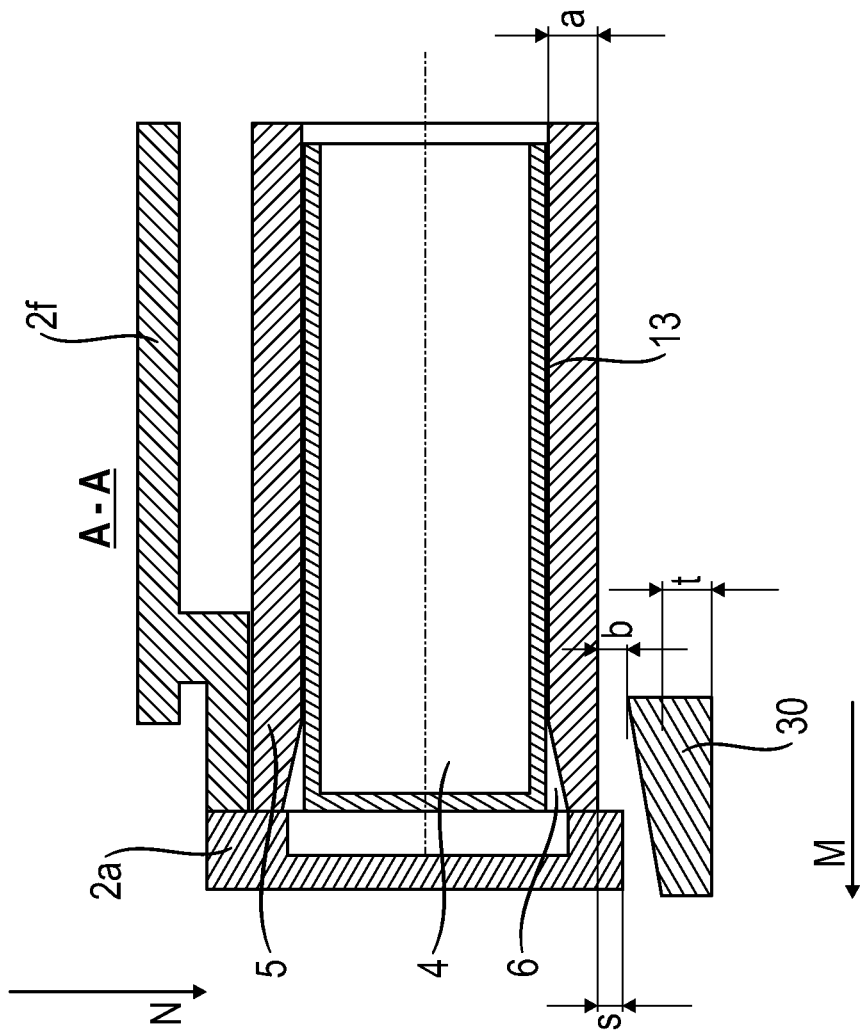
FIG. 9*b* shows a sectional view of section plane A-A in FIG. 9*a*.

FIGS. 9*a* and 9*b* show a shock absorbing device 7 according to a second embodiment, in which the shock absorbing element 8*a* has an asymmetrical or trapezoidal (also referred to as wedge-shaped) cross-sectional area 30. Here, the cross-sectional area 30 is configured in such a way that the shorter side face of the cross-sectional area configured as a trapezoid is in arrow direction M. In other words: the shorter side face of the trapezoid (or of the cross-sectional area 30 configured as a trapezoid) faces the front side face 2*a* of the rechargeable battery housing 2.

FIG. 9*a* shows a lateral sectional view through a corner region of the rechargeable battery housing 2 and of the shock absorbing element according to the second embodiment in a no-load state. The shock absorbing element 8*a* is at a distance b from the rechargeable battery housing. FIG. 9*b* shows a sectional view of section plane A-A in FIG. 9*a*, likewise in a no-load state. A no-load state means that there is no external force acting on the shock absorbing element 8*a*. As is also apparent in FIG. 9*b*, the rechargeable battery housing 2 projects with an overlap s beyond the bottom edge of the cell holder 5 in arrow direction N.

Figure 10A:
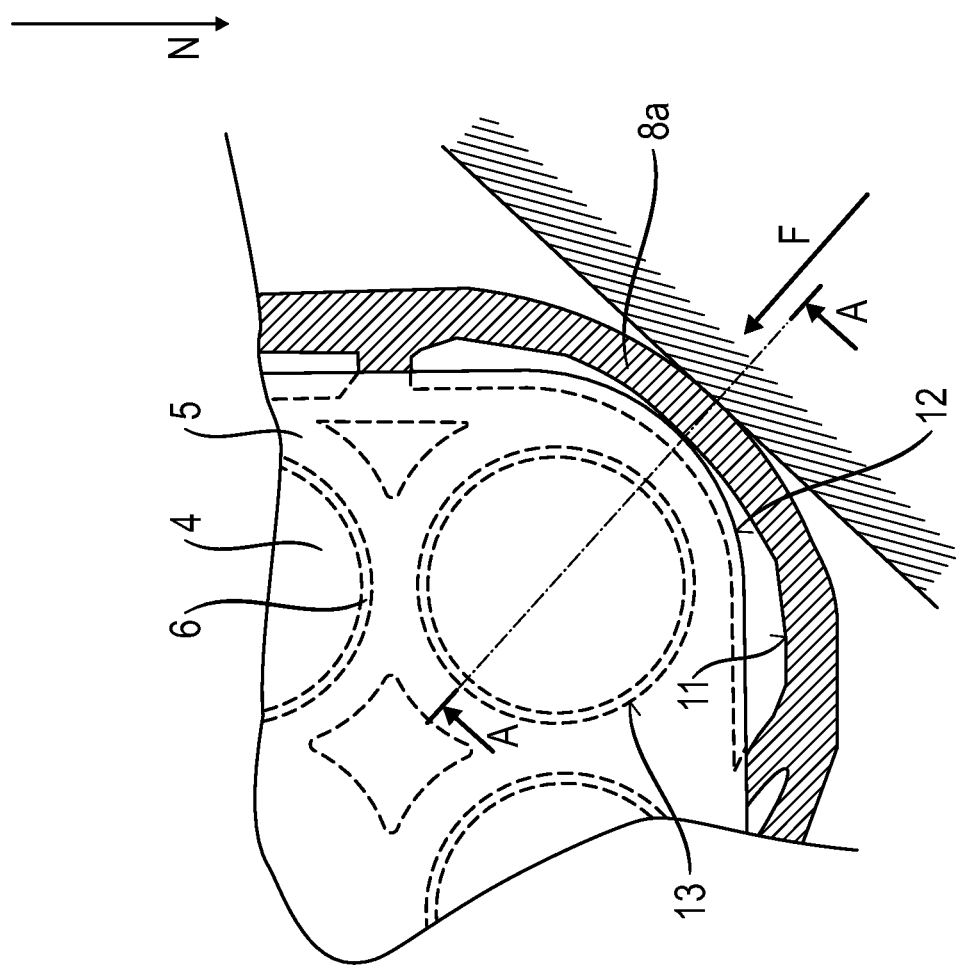
FIG. 10*a* shows a lateral sectional view through a corner region of the housings of the rechargeable battery and of the shock absorbing element according to a second embodiment in a partially loaded state.
Figure 10B:
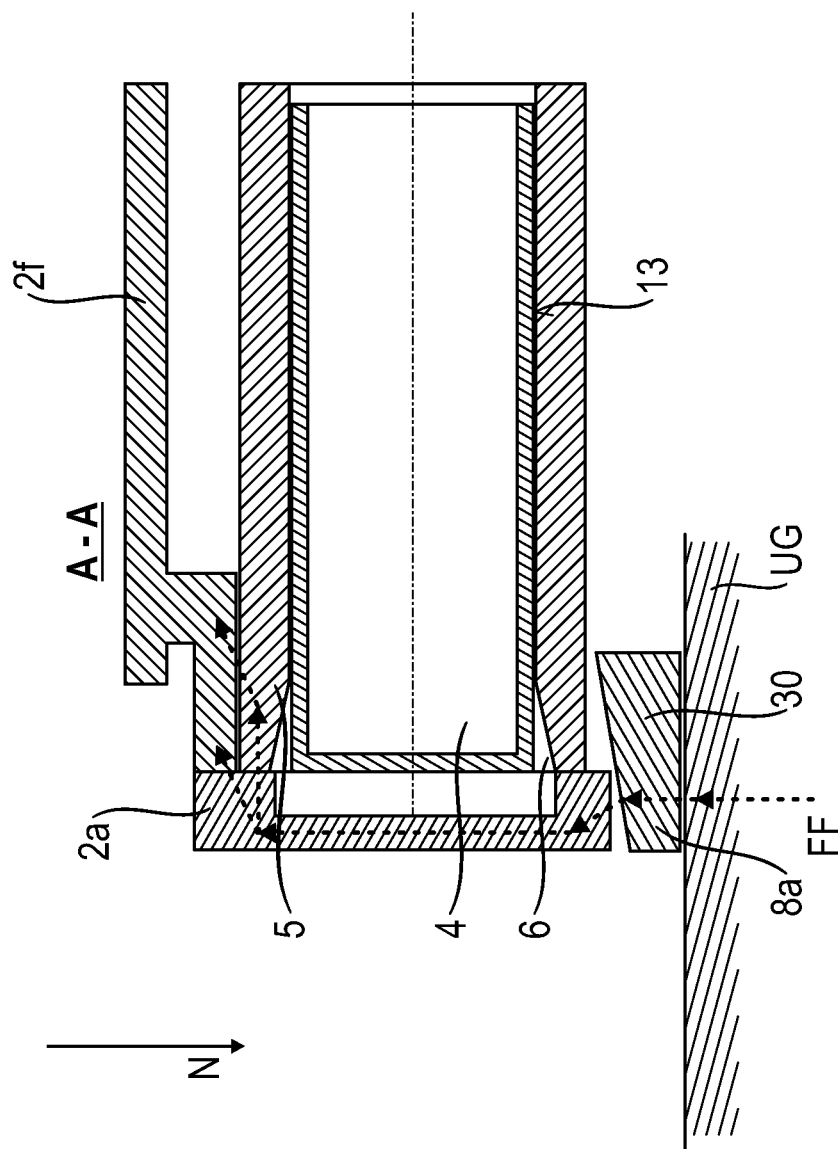
FIG. 10*b* shows a sectional view of section plane A-A in FIG. 10*a*.

In FIG. 10*a*, the shock absorbing device 7 according to the second embodiment is shown when a first force F is exerted on the shock absorbing element 8*a*. The first force F results from a fall of the rechargeable battery 1 and the impact of the rechargeable battery housing 2 on a hard inelastic underlying surface UG (e.g. concrete). In FIG. 10*a*, it is apparent in comparison with FIG. 9*a* that the shock absorbing element is being deformed and moved toward the surface of the rechargeable battery housing. As illustrated in FIG. 10*b*, the inner surface 11 of the shock absorbing element 8*a* is resting against the outer surface 12 of the rechargeable battery housing 2, with the result that the shock energy or the force flow FF is diverted from the shock absorbing element 8*a*, via the front side face 2*a*, into the top side face 2*f* of the rechargeable battery housing 2 and partially into the cell holder 5 and is guided around the rechargeable battery cells 4. As is likewise apparent from FIG. 10*b*, the front side face 2*a* of the rechargeable battery housing 2 is not compressed, and therefore the overlap s of the rechargeable battery housing 2 still exists.

Figure 11A:
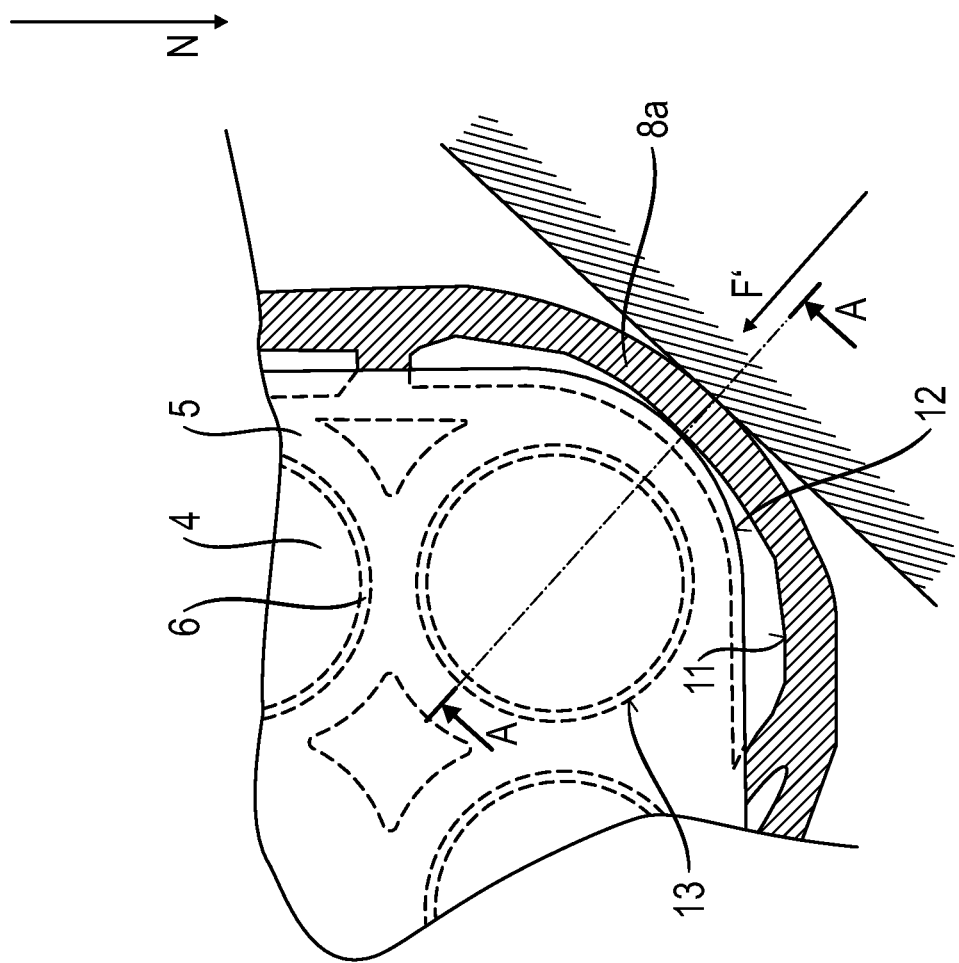
FIG. 11*a* shows a lateral sectional view through a corner region of the housings of the rechargeable battery and of the shock absorbing element according to a second embodiment in a fully loaded state.
Figure 11B:
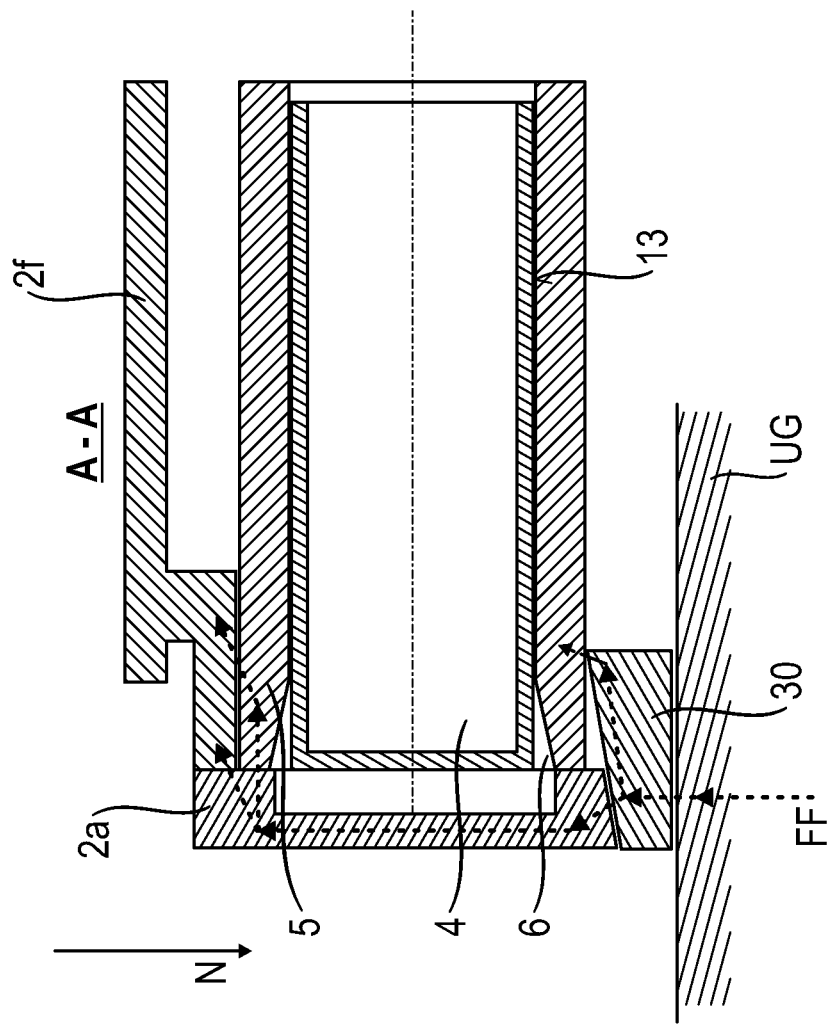
FIG. 11*b* shows a sectional view of section plane A-A in FIG. 11*a*.

In FIGS. 11*a* and 11*b*, the shock absorbing device 7 according to the second embodiment is shown when a second force F', which is greater than the first force F, is being exerted on the shock absorbing element 8*a*. The second force F' exerted on the shock absorbing element 8*a* has the effect that the shock absorbing element 8*a* is pressed more strongly against the front side face 2*a* of the rechargeable battery housing 2. Owing to the higher second force F', the front side face 2*a* of the rechargeable battery housing 2 is compressed, with the result that the overlap s of the rechargeable battery housing 2 is pressed in. By the pressing in of the overlap s, additional shock energy or impact energy is absorbed by the rechargeable battery housing 2, and the rechargeable battery cells 4 are additionally protected.

LIST OF REFERENCE SIGNS

1: rechargeable battery
2: housing for the rechargeable battery
2*a*: front side face
2*b*: left-hand wall side face
2*c*: right-hand wall side face
2*d*: rear side face
2*e*: bottom side face
2*f*: top side face
3: interface
4: energy storage cell
5: cell holding device
6: bores
7: shock absorbing device
8*a*, 8*b*, 8*c*, 8*d*: shock absorbing element
9*a*: first end of the shock absorbing element configured as a yoke
9*b*: second end of the shock absorbing element configured as a yoke
10: lateral edge between the front side face and the bottom side face of the rechargeable battery housing
11: inner surface of the shock absorbing element
12: outer surface of the rechargeable battery housing
13: surface of an energy storage cell
20: symmetrical rectangular cross-sectional area of the shock absorbing element
30: trapezoidal cross-sectional area
81: first component piece of the shock absorbing element configured as a yoke
82: second component piece of the shock absorbing element configured as a yoke
83: third component piece of the shock absorbing element configured as a yoke
84: fourth component piece of the shock absorbing element configured as a yoke
85: fifth component piece of the shock absorbing element configured as a yoke
$\alpha, \beta, \gamma, \delta$: obtuse angles between component pieces of the shock absorbing element configured as a yoke
UG: underlying surface
FF: force flow
F: first force
F': second force

What is claimed is:

1. A device for supplying a machine tool with electrical energy, the device comprising:
   a rechargeable battery including an interface for connecting the battery to the machine tool and a housing for accommodating at least one energy storage cell, the housing having a top side face, a bottom side face, a first wall side face connecting the top side face and the bottom side face and a second wall side face connecting the top side face and the bottom side face, the first wall side face angled with respect to the bottom side face and connected to the bottom side face at a corner, the interface being at the top side face; and
   a shock absorbing device including at least one shock absorber, the shock absorber extending around the corner and having adjoining first, second and third sections with first, second and third inner surfaces, respectively,
   the first inner surface being parallel to and spaced apart from the first side wall face, the third inner surface being parallel to and spaced apart from the bottom side face, and the second inner surface being spaced apart from the corner.

2. The device as recited in claim 1 wherein the housing is a cell holder holding the at least one energy storage cell.

3. The device as recited in claim 1 wherein the first inner surface is at an obtuse angle to the second inner surface and the second inner surface is at a second obtuse angle to the third inner surface.

4. The device as recited in claim 3 wherein the obtuse angle is between 110° and 150°.

5. The device as recited in claim 4 wherein the second obtuse angle is between 110° and 150°.

6. The device as recited in claim 1 wherein the shock absorber has a fourth section connected to the first section and directly connected to the first wall side face.

7. The device as recited in claim 6 wherein the shock absorber includes a fifth section connected to the third section and directly connected to the bottom side face.

8. The device as recited in claim 1 wherein the corner is curved to connect the first wall side face and the bottom side face.

9. The device as recited in claim 1 wherein the corner is defined by a flat plane connecting and angled with respect to the first wall side face and the bottom side face.

10. The device as recited in claim 1 wherein the second inner surface is planar.

11. The device as recited in claim 1 wherein the first wall side face and the bottom side face are angled at 90 degrees.

12. The device as recited in claim 1 wherein the housing and the shock absorber are made of a same material.

13. The device as recited in claim 12 wherein the shock absorber and the housing are made of polycarbonate or polyamide.

14. The device as recited in claim 1 wherein the shock absorber is made of polycarbonate or polyamide.

15. The device as recited in claim 1 wherein the housing accommodates at least four storage energy cells in at least two rows and two columns.

16. The device as recited in claim 1 wherein the first inner surface is spaced apart from the first side wall face by a distance b, and the first section has a thickness t, wherein t meets the following: $0.5 \times b \leq t \leq 2 \times b$.

17. The device as recited in claim 16 wherein the third inner surface is spaced apart from the bottom side face by the distance b.

18. The device as recited in claim 1 wherein the shock absorbing device is configured so that the second inner surface is movable with respect to the corner to enable contact between the second inner surface and the corner.

19. A device for supplying a machine tool with electrical energy, the device comprising:
   a rechargeable battery including an interface for connecting the battery to the machine tool and a housing for accommodating at least one energy storage cell, the housing having a top side face, a bottom side face, a left-hand wall side face connecting the top side face and the bottom side face and a right-hand wall side face connecting the top side face and the bottom side face, the left-hand wall side face angled with respect to the bottom side face and connected to the bottom side face at a corner, the interface being at the top side face; and
   a shock absorbing device including at least one shock absorber, the shock absorber extending around the corner and having adjoining first, second and third sections with first, second and third inner surfaces, respectively,
   the first inner surface being spaced apart from the left-hand side wall face, the second inner surface being spaced apart from the corner and the third inner surface being spaced apart from the bottom side face.

20. The device as recited in claim 19 wherein the housing includes a front side face and a rear side face.

\* \* \* \* \*